United States Patent [19]

Massaccesi

[11] Patent Number: 5,297,447
[45] Date of Patent: Mar. 29, 1994

[54] STEERING AXLE FOR VEHICLES, PARTICULARLY FOR AGRICULTURAL TRACTORS

[75] Inventor: Gianni Massaccesi, Vigodarzere, Italy

[73] Assignee: Carraro S.p.A., Campodarsego, Italy

[21] Appl. No.: 978,977

[22] Filed: Nov. 19, 1992

[30] Foreign Application Priority Data

Nov. 22, 1991 [IT] Italy ............ PD91A000216

[51] Int. Cl.⁵ .................................. F16H 57/02
[52] U.S. Cl. ................. 74/607; 74/606 R; 475/246; 280/93
[58] Field of Search .......... 74/606 R, 607; 475/246, 475/334, 347, 348; 280/33, 846, 95.1

[56] References Cited

U.S. PATENT DOCUMENTS

| | | | |
|---|---|---|---|
| 2,651,216 | 9/1953 | Alden | 475/246 |
| 3,905,089 | 9/1975 | Osenbaugh et al. | 475/246 |
| 4,504,074 | 3/1985 | Smith | 280/93 |
| 4,515,380 | 5/1985 | Schumacher | 280/93 |
| 4,543,853 | 10/1985 | von Hiddessen et al. | 475/246 |
| 4,652,011 | 3/1987 | Hollerweger et al. | 280/846 X |
| 4,733,578 | 3/1988 | Glaze et al. | 475/246 |
| 4,914,800 | 4/1990 | Cook | 475/246 X |
| 5,041,069 | 8/1991 | Horst | 475/246 X |
| 5,094,655 | 3/1992 | Sato | 475/246 X |
| 5,197,561 | 3/1993 | Holka | 180/79.3 |

FOREIGN PATENT DOCUMENTS

| | | |
|---|---|---|
| 1172124 | 6/1964 | Fed. Rep. of Germany ...... 475/246 |
| 1473517 | 2/1967 | France . |
| 60-001075 | 1/1985 | Japan . |
| 2223068 | 3/1990 | United Kingdom ................ 475/246 |
| WO8905742 | 10/1988 | World Int. Prop. O. . |

*Primary Examiner*—Vinh T. Luong
*Attorney, Agent, or Firm*—Sughrue, Mion, Zinn, Macpeak & Seas

[57] ABSTRACT

A steering axle includes a beam pivotally mounted on a load-bearing structure of a vehicle. A steering actuator is mounted on the beam and includes a casing which provides a journal formation for pivotally mounting the beam on the load-bearing structure.

8 Claims, 2 Drawing Sheets

STEERING AXLE FOR VEHICLES, PARTICULARLY FOR AGRICULTURAL TRACTORS

BACKGROUND OF THE INVENTION

The present invention relates to a steering axle for vehicles, particularly for agricultural tractors, being of a type which comprises a beam bearing at least one journal formation for pivotally mounting the axle on a load-bearing structure of a vehicle and a steering actuator including a case which is fixed to the beam.

Steering axles including such features are known from the present production of the same applicant. In such known axles, the beam has in its central portion two juxtaposed and coaxial journal formations adapted to be received pivotally in corresponding seats of the load-bearing structure of the vehicle, so that the axle, in its entirety, can swing in a plane extending substantially transverse to the vehicle, about the axle of the journal formations.

A drawback of these known axles is that the steering actuator, although leaning against the axle beam, is still undesirably cumbersome thereby hindering the mounting of the axle on tractors of a different kind. Furthermore, this actuator is in some cases not well protected against shocks and against the entrance of contaminants such as dust, clods, mud etc.

Another example of a steering axle relevant to this invention is disclosed in the Japanese Patent Publication n. 60-1075(A).

In that document, an axle is disclosed which is provided with a gear-type steering system operated through a steering actuator for pivoting the road wheel hubs fitted to the opposite ends of the beam.

That actuator is attached to the load-bearing structure of the vehicle and has an output shaft which carries, keyed to its free end, one gear of the steering system. The shaft extends through a bore in the load-bearing structure of the vehicle and a corresponding tubular passageway formed in the respective journal formation on the beam.

A steering axle according to that design has a number of drawbacks.

First, the actuator is mounted at a location where it is subject to shocks and may come to harm. This is more likely to occur when the axle is used on such all-terrain vehicles as agricultural tractors, where the probability of shocks is relatively high.

Secondly, with the above construction, relative rotation is allowed to take place both between the actuator shaft and the corresponding journal formation, as well as between the latter and the load-bearing structure of the tractor whereto said actuator is, in turn, attached. The corresponding journal formation of the beam intervenes, therefore, between the actuator shaft and the load-bearing structure of the vehicle, while being mounted to swing with respect to either. Accordingly, the machining tolerances for the different component parts add algebraically to one another, to establish operating conditions that make the required oil-tight fits between the axle beam and the actuator shaft difficult to achieve. This problem is made the more serious since the standard admissible tolerances for journal formations in the agricultural tractor industry are comparatively large. Further, with that design, the axle tends to steer, even with the steering wheel held still, every time that it is caused to perform swinging movements relatively to the vehicle structure, and this on account of the steering system gears being forced to roll about the actuator gear whenever such a situation of relative oscillation is encountered. Thus, the structure proposed in said document is unsuited to such applications.

SUMMARY OF THE INVENTION

The technical problem at the basis of this invention is that of providing a steering axle with a corresponding steering actuator structurally and functionally designed so as to overcome the inconvenience considered in connection to the cited prior art.

This problem is solved by the invention with an axle of the kind initially mentioned, wherein the actuator case provides said journal formation.

BRIEF DESCRIPTION OF THE DRAWING

The invention will be now disclosed in detail with reference to a preferred embodiment thereof shown, by way of illustration and not of limitation, in the accompanying drawings, wherein.

DETAILED DESCRIPTION OF THE INVENTION

Figure 1:
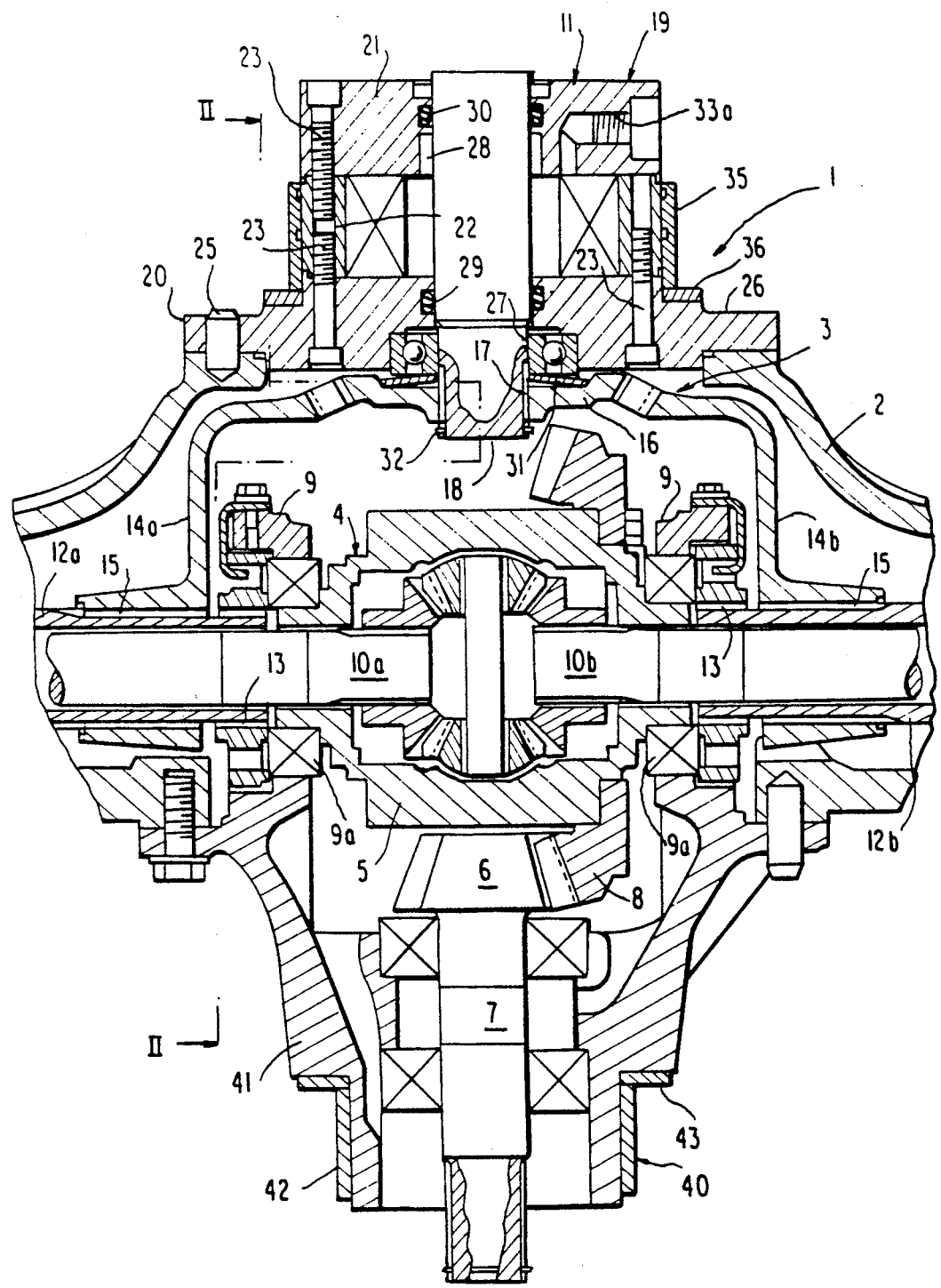
FIG. 1 is a fragmentary longitudinal section view of a steering axle according to the invention.
Figure 2:
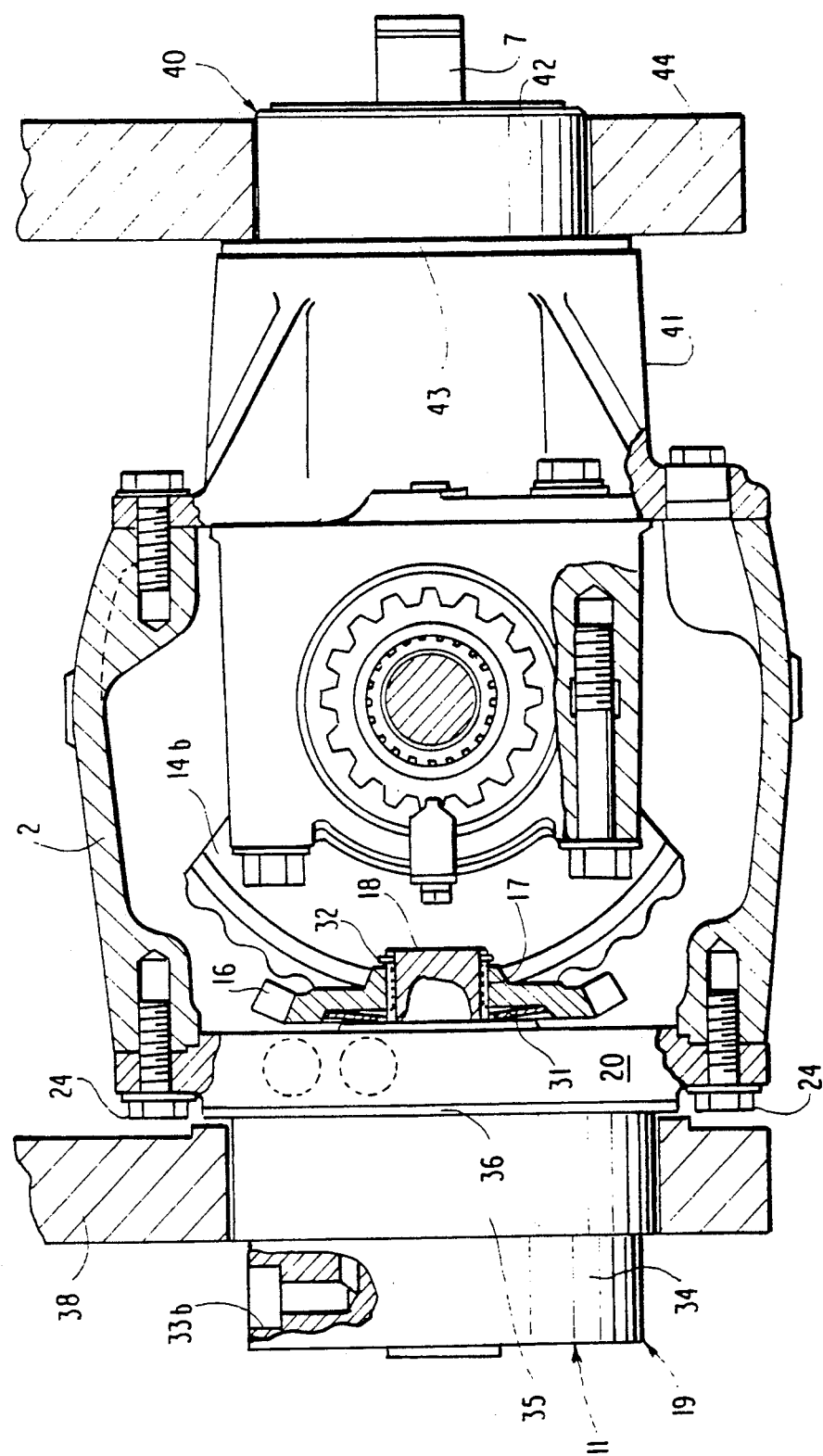
FIG. 2 is a section view taken along line II—II of the axle of FIG. 1 mounted on a load-bearing structure of a vehicle shown only partially.

In the figures, indicated at 1 is a steering power axle such as the front axle of a four-wheel-drive agricultural tractor, whose load-bearing structure is only partially shown in FIG. 2. This axle 1 comprises a box-type beam 2 housing a steering mechanism 3 and a transmission 4.

The transmission 4 comprises a differential mechanism 5 which includes a pinion gear 6, and respective shaft 7, and a ring gear 8; the differential mechanism 5 is designed to distribute the motion input to the pinion gear 6 differentially to two axle shafts 10a,b being each associated with a respective axle road wheel.

The differential mechanism 5 is carried inside the beam 2 on supports 9 and conventional bearings 9a.

The steering mechanism 3 comprises a steering actuator generally indicated at 11 for operating two tubular shafts 12a,b, one for each road wheel, which fit inside the beam 2 coaxially with the axle shafts 110a,b.

On the differential mechanism 5 side, the shafts 12a,b are supported rotatably on the same supports 9 as the differential mechanism 5 with suitable bearings 13 therebetween, and each shaft carries a steering gear 14a,b respectively, which gear is made rotatively rigid therewith by means of a splined connection 15. On the remote side, said shafts and the axle as a whole are configured similarly to the embodiments disclosed in copending U.S. patent application Ser. No. 07/835,542 filed Feb. 14, 1992 which is assigned to the assignee of the present application.

Gears 14a,b are both in mesh engagement with a main gear 16 keyed to a shaft 18 of actuator 11 while being allowed to slide therealong by the provision of a splined connection 17.

Said actuator 11 is typically configured internally as a conventional hydraulic motor, and has been drawn schematically only, it being understood that it has, for parts not shown, a conventional design well known to a skilled person in the art, whereby the shaft 18 can be driven rotatively about its axis in either direction when supplied with a suitable medium, such as a pressurized oil. It comprises a case, generally shown at 19, having two flanges 20, 21 clamped together on a sleeve 22 by means of threaded tie rods 23. Flange 20 is formed peripherally with a plurality of holes for screws 24 and pins 25 whereby the actuator can be secured at an aperture 26 in the beam 2 so as to seal it off.

Shaft 18 is supported on the flanges 20, 21 through respective bearings 27, 28 and has seals 29, 30 effective to prevent pressurized oil from leaking out of the case 19 or contaminants from seeping into the actuator. Between bearing 27 and the main gear 16 is an elastic member such as a Belleville washer 31 tending to urge said gear 16 into mesh engagement with the steering gears 14a,b. A snap ring 32 is arranged at the corresponding free end of shaft 18 to prevent gear 16 from slipping off. The ring 32 is positioned to allow of an axial play for the gear 16, such that the washer 31 can perform the function of a backlash take-up device between the steering mechanism gears, as explained in detail with reference to copending U.S. patent application Ser. No. 07/835,542 filed Feb. 14, 1992 which is assigned to the assignee of the present application.

Formed in the flange 21 are two conduits 33a,b, respectively for delivery and return of the working medium to/from the actuator 11. It is also contemplated that, for enhanced protection of the supply piping to the actuator, said conduits 33a,b be formed radially of the flange 20, as illustrated by dash lines in FIG. 2, or that they extend within the beam 2 to communicate, for example, proximate to that beam portion which encloses and supports shaft 7. The last-mentioned approach has not been shown because this well within the ability of a person of ordinary skill in the art on the grounds of the directions given hereinabove.

The actuator case 19 has a cylindrical outer surface 34 over which there fit, at the sleeve 22 and part of flange 20, first and second washers 35, 36 having tubular and annular configurations, respectively, for a radial and axial bearing conventionally provided on a support 38 which belongs to the load-bearing structure of a vehicle equipped with the axle 1.

Thus, the case 19 provides one of the two journal formations about which the axle 1 is allowed to swing. The other journal formation, shown at 40, is defined on the exterior of a collar 41 extending from the beam 2 on the transversely remote side from the case 19 coaxially therewith. Said second journal encircles shaft 7, providing support for it, and also includes washers 42, 43 serving the same function as the respective washers 35, 36 for a corresponding bearing provided on a support 44, again belonging to the load-bearing structure of a vehicle equipped with the axle 1.

The invention so described is subject to several modifications and variations all included in the same inventive concept; as an example, the steering mechanism, which in the embodiment shown above is of the gear type with tubular shafts coaxial to the axle shafts, could have a different configuration. As an example, it is possible to deviate the steering actuators shaft by means of traditional angular gear transmissions to the exterior of the beam in order to drive traditional quadrilateral linkage steering mechanism with struts and steering arms.

Among the advantages afforded by the invention, is that it provides optimum protection for the steering actuator while significantly reducing it space requirements. Further, the standard machining tolerances for the case of the hydraulic motor constituting the actuator are by themselves adequate to fill the requirements for accuracy of the fit between the journal formations on the beam and the supports on the load-bearing structure of the vehicle.

Also, the axle is free to swing about the journal formations without interfering with the operation of the steering system. Lastly, by having the supply conduits arranged such that they communicate to an area included between the supports on the load-bearing structure of the vehicle from the actuator or the beam, the supply piping to the actuator can be well guarded.

I claim:

1. A steering axle for a vehicle comprising a beam housing a steering mechanism and a transmission therein, steering actuator means attached to said beam and operably connected to said steering mechanism, said actuator means having a case with an external surface for pivotally mounting said actuator means and attached axle in a load-bearing vehicle structure.

2. A steering axle as set forth in claim 1, further comprising axial and radial bearing means mounted on said external surface of said case.

3. A steering axle as set forth in claim 2, wherein said axial and radial bearing means are comprised of a flat washer and a cylindrical washer, respectively.

4. A steering axle as set forth in claim 1, further comprising collar means attached to said beam in co-axial alignment with said case on an opposite side of said beam from said case for pivotally mounting said collar and attached axle in a load-bearing vehicle structure.

5. A steering axle as set forth in claim 4, further comprising axial and radial bearing means mounted on said collar.

6. A steering axle as set forth in claim 5, wherein said axial and radial bearing means are comprised of a flat washer and a cylindrical washer, respectively.

7. A steering axle as set forth in claim 1, wherein said steering actuator means is comprised of a hydraulic motor having a shaft extending into said beam, a gear slidably mounted on said shaft in operative meshing engagement with said gear mechanism and elastic means disposed between said gear and said case for urging said gear away from said case into said meshing engagement with said steering mechanism.

8. A steering axle as set forth in claim 7, further comprising supply conduits extending through said casing for supplying hydraulic fluid to said hydraulic motor.

* * * * *